(12) United States Patent
Jang et al.

(10) Patent No.: US 8,831,375 B2
(45) Date of Patent: Sep. 9, 2014

(54) METHOD OF OBTAINING VARIANCE DATA OR STANDARD DEVIATION DATA FOR REDUCING NOISE, AND DIGITAL PHOTOGRAPHING APPARATUS INCLUDING RECORDING MEDIUM STORING VARIANCE DATA OR STANDARD DEVIATION DATA FOR REDUCING NOISE

(75) Inventors: Soon-geun Jang, Changwon (KR); Eun-sun Ahn, Changwon (KR); Jin-pyo Gwak, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1097 days.

(21) Appl. No.: 12/316,143

(22) Filed: Dec. 10, 2008

(65) Prior Publication Data

US 2009/0180703 A1 Jul. 16, 2009

(30) Foreign Application Priority Data

Jan. 15, 2008 (KR) .................. 10-2008-0004428

(51) Int. Cl.
*G06K 9/40* (2006.01)
*H04N 5/00* (2011.01)

(52) U.S. Cl.
USPC .................. 382/275; 382/261; 348/610

(58) Field of Classification Search
None
See application file for complete search history.

(56) References Cited

U.S. PATENT DOCUMENTS

| | | | |
|---|---|---|---|
| 5,596,654 A * | 1/1997 | Tanaka ..................... | 382/168 |
| 6,111,911 A * | 8/2000 | Sanderford et al. ........ | 375/147 |
| 7,352,911 B2 | 4/2008 | Maurer | |
| 7,426,313 B2 | 9/2008 | Shohdohji | |
| 2005/0025378 A1 | 2/2005 | Maurer | |
| 2005/0089239 A1* | 4/2005 | Brajovic ................... | 382/266 |
| 2005/0117807 A1* | 6/2005 | Shohdohji ................ | 382/233 |
| 2008/0002902 A1 | 1/2008 | Lin et al. | |
| 2012/0141004 A1* | 6/2012 | Matsumoto et al. ........ | 382/131 |

FOREIGN PATENT DOCUMENTS

| | | |
|---|---|---|
| JP | 2005-167520 A | 6/2005 |
| JP | 2007-244675 A | 9/2007 |
| KR | 10-2007-0012195 A | 1/2007 |

OTHER PUBLICATIONS

Tomasi et al., "Bilateral Filtering for Gray and Color Images," Proceedings of the 1998 IEEE International Conference on Computer Vision, Bombay, India (1998).
Office Action issued for KR 10-2008-0004428 (Feb. 3, 2014).
Office Action issued for KR 10-2008-0004428 (Jul. 7, 2014).

* cited by examiner

*Primary Examiner* — Randolph I Chu
(74) *Attorney, Agent, or Firm* — Drinker Biddle & Reath LLP

(57) ABSTRACT

A method of obtaining variance data or standard deviation data for efficiently reducing noise in an image is provided. The method includes (a) dividing an image into a plurality of clusters; (b) checking frequency data of data values of pixels included in each cluster; (c) obtaining a weighted average of the data values of the pixels included in each cluster; (d) obtaining a variance or a standard deviation of the data values of the pixels included in each cluster by using the weighted average; and (e) obtaining variance data or standard deviation data in accordance with weighted averages by using the weighted average and the variance or the standard deviation in each cluster. A digital photographing apparatus is also provided that includes a recording medium storing variance data or standard deviation data for efficiently reducing noise in an image which is obtained in accordance with the above method.

17 Claims, 8 Drawing Sheets

METHOD OF OBTAINING VARIANCE DATA OR STANDARD DEVIATION DATA FOR REDUCING NOISE, AND DIGITAL PHOTOGRAPHING APPARATUS INCLUDING RECORDING MEDIUM STORING VARIANCE DATA OR STANDARD DEVIATION DATA FOR REDUCING NOISE

CROSS-REFERENCE TO RELATED PATENT APPLICATION

This application claims the benefit of Korean Patent Application No. 10-2008-0004428, filed on Jan. 15, 2008, in the Korean Intellectual Property Office, the entire contents of which is incorporated herein by reference.

BACKGROUND OF THE INVENTION

1. Field of the Invention

The present invention relates to a method of obtaining variance data or standard deviation data for reducing noise, and a digital photographing apparatus including a recording medium storing variance data or standard deviation data for reducing noise. More particularly, the present invention relates to a method of obtaining variance data or standard deviation data for efficiently reducing noise in an image, and a digital photographing apparatus including a recording medium storing variance data or standard deviation data for efficiently reducing noise in an image.

2. Description of the Related Art

A conventional digital photographing apparatus stores image data which is obtained by a photographing operation in a photographing mode, in a storage medium and displays an image on a display unit by using the image data stored in the storage medium.

The conventional digital photographing apparatus obtains image data from light projected onto an imaging device included in the conventional digital photographing apparatus, and processes the image data. Noise is created while the image data is being obtained from light projected onto the imaging device and/or while the image data is being processed. Such noise deteriorates the contrast of an image by making the image rough in a dark image, and also making colors dull and making an outline of a photographic subject blurred in a bright image.

SUMMARY OF THE INVENTION

The present invention provides a method of obtaining variance data or standard deviation data for efficiently reducing noise in an image, and a digital photographing apparatus including a recording medium storing variance data or standard deviation data for efficiently reducing noise in an image.

According to an embodiment of the present invention, a method of obtaining variance data or standard deviation data for reducing noise is provided. The method includes (a) dividing an image into a plurality of clusters; (b) checking frequency data of data values of pixels included in each cluster; (c) obtaining a weighted average of the data values of the pixels included in each cluster in consideration of the frequency data of the data values of the pixels included in each cluster; (d) obtaining a variance or a standard deviation of the data values of the pixels included in each cluster by using the weighted average; and (e) obtaining variance data or standard deviation data in accordance with weighted averages by using the weighted average and the variance or the standard deviation in each cluster.

(A) may be performed by using a k-means algorithm.

(A) may include (a1) arranging a plurality of seeds corresponding to the number of clusters on the image and giving an arbitrary data value to each seed; (a2) determining a closest seed of each pixel of the image from among the seeds in accordance with distances based on spatial positions and data values; (a3) updating a data value of each seed to an average of the data values of pixels of which the seed is determined as the closest seed, and updating a spatial position of each seed to an average of spatial positions of the pixels of which the seed is determined as the closest seed; (a4) if a difference between the spatial position and the data value of each seed before the updating is performed and the spatial position and the data value of the seed after the updating is performed is greater than a threshold value, repeating (a1) through (a3); and (a5) if the difference between the spatial position and the data value of each seed before the updating is performed and the spatial position and the data value of the seed after the updating is performed is equal to or less than the threshold value, dividing the image into a plurality of clusters by grouping pixels of which each seed is determined as the closest seed, into the same cluster.

Each pixel may have YCbCr data, and (a1) may include giving arbitrary YCbCr data to each seed.

(A2) may include determining the closest seed of each pixel by calculating a distance between the pixel and each seed in accordance with Equation 1, by assuming that a spatial position of each pixel of the image is $(x_{pix}, y_{pix})$, YCbCr data of the pixel is $(Y_{pix}, Cb_{pix}, Cr_{pix})$ the spatial position of an ith seed of the image is $(X_{seed\_i}, Y_{seed\_i})$, and the YCbCr data of the ith seed is $(Y_{seed\_i}, Cb_{seed\_i}, Cr_{seed\_i})$.

$$D_i = \sqrt{\begin{array}{c}(x_{pix} - x_{seed\_i})^2 + (y_{pix} - y_{seed\_i})^2 + (Y_{pix} - Y_{seed\_i})^2 + \\ (Cb_{pix} - Cb_{seed\_i})^2 + (Cr_{pix} - Cr_{seed\_i})^2\end{array}} \quad (1)$$

Each pixel may have YCbCr data, and (b) through (e) may be performed on each of Y, Cb, and Cr data.

(B) may include checking a graph of $y=w_i(x)$, by assuming that an x axis indicates the data values of the pixels included in an ith cluster and a y axis indicates frequencies of the data values.

(C) may include obtaining a weighted average $WM_n$ of the data values of the pixels included in each cluster in accordance with Equation 2, by assuming that the number of pixels included in an nth cluster is k and data of an ith pixel is $x_i$.

$$WM_n = \frac{1}{k}\sum_{i=1}^{k} w_n(x_i) \cdot x_i \quad (2)$$

(D) may include obtaining a variance $\sigma_n^2$ of the data values of k pixels included in the nth cluster in accordance with Equation 3 or obtaining a standard deviation $\sigma_n$ of the data values of the k pixels included in the nth cluster in accordance with Equation 4.

$$\sigma_n^2 = \frac{1}{k}\sum_{i=1}^{k}(x_i - WM_n)^2 \quad (3)$$

$$\sigma_n = \sqrt{\frac{1}{k}\sum_{i=1}^{k}(x_i - WM_n)^2} \qquad (4)$$

(E) may include obtaining the variance data or the standard deviation data in accordance with the weighted averages by assuming that a horizontal axis indicates weighted averages and a vertical axis indicates variances or standard deviations.

Each pixel may have data values having different formats, and (b) through (e) may be performed on each of the data values having different formats.

Each pixel may have R, G, and B data, and (b) through (e) may be performed on each of the R, G, and B data.

Each pixel may have luminance data, first color data, and second color data, and (b) through (e) may be performed on each of the luminance data, the first color data, and the second color data.

(A) may include dividing each of N images into a plurality of clusters, and clusters corresponding to each other may be regarded as one cluster in (b) through (e).

According to another embodiment of the present invention, a digital photographing apparatus is provided. The digital photographing apparatus includes a recording medium storing variance data or standard deviation data for reducing noise which is obtained in accordance with the above-described method.

According to another embodiment of the present invention, a method of obtaining variance data or standard deviation data for reducing noise is provided. The method includes (i) preparing a digital photographing apparatus including a recording medium storing variance data or standard deviation data for reducing noise, which is obtained in accordance with the method of claim 1, as first data; (ii) obtaining an additional image by using the digital photographing apparatus; (iii) dividing the additional image obtained in (ii) into a plurality of clusters; (iv) checking frequency data of data values of pixels included in each cluster of the additional image; (v) obtaining a weighted average of the data values of the pixels included in each cluster of the additional image in consideration of the frequency data of the data values of the pixels included in each cluster; (vi) obtaining a variance or a standard deviation of the data values of the pixels included in each cluster of the additional image by using the weighted average; (vii) obtaining variance data or standard deviation data in accordance with weighted averages, as second data by using the weighted average and the variance or the standard deviation in each cluster of the additional image; and (viii) obtaining the variance data or the standard deviation data for reducing noise which is ultimately obtained by modifying the first data by using the second data.

According to another embodiment of the present invention, a digital photographing apparatus is provided. The digital photographing apparatus includes a recording medium storing variance data or standard deviation data for reducing noise, which is obtained in accordance with the above-described method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining embodiments of the invention with reference to the attached drawings.

A method of obtaining variance data or standard deviation data for reducing noise, according to an embodiment of the present invention, will now be described.

Initially, an image is divided into a plurality of clusters. Here, a cluster includes pixels having mutual similarities. In particular, these pixels have similar data values. It is found that a distribution of the noise varies in accordance with the data values of pixels while the method of obtaining variance data or standard deviation data for reducing noise, according to an embodiment of the present invention, is being performed. Thus, in order to efficiently reduce the noise, an image is divided into a plurality of clusters each including pixels having similar data values.

Hereinafter, a method of dividing an image into a plurality of clusters, in particular, by using a k-means algorithm will be described.

Figure 1A:
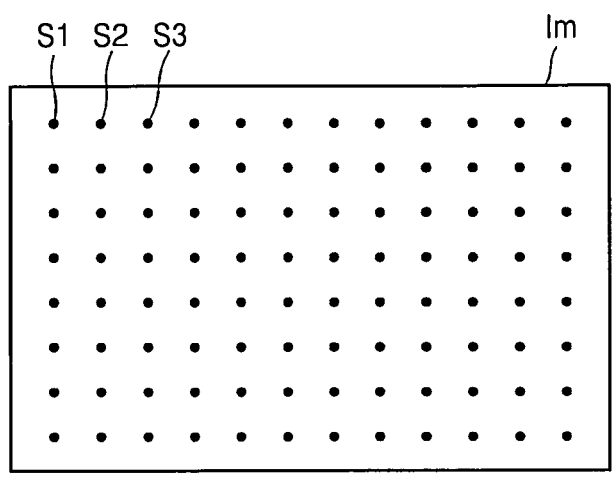
FIG. 1A is a schematic conceptual view of an example of an image showing an initial distribution of a plurality of seeds for obtaining variance data or standard deviation data for reducing noise, according to an embodiment of the present invention.

FIG. 1A is a schematic conceptual view of an example of an image Im showing an initial distribution of a plurality of seeds for obtaining variance data or standard deviation data for reducing noise, according to an embodiment of the present invention. Initially, the seeds are arranged on the image Im as illustrated in FIG. 1A. The number of the seeds corresponds to the number of clusters into which the image Im is to be divided. In FIG. 1A, ninety six seeds are arranged. However, it is obvious that the present invention is not limited thereto. For example, if each pixel has YCbCr data, conventionally, each of Y, Cb, and Cr data is 8-bit data. Thus, two hundred and fifty six ($256=2^8$) seeds may be arranged on the image Im. Furthermore, in FIG. 1A, the seeds are evenly arranged. However, it is obvious that various changes may be made thereto. For example, the seeds may be randomly arranged.

Each of the arranged seeds has the same data format as each pixel of the image Im. For example, if each pixel of the image Im has YCbCr data, each seed also has YCbCr data, and if each pixel has RGB data, each seed also has RGB data. Hereinafter, for convenience of explanation, it is assumed that each pixel of the image Im has YCbCr data and each seed also has YCbCr data. A data value of each seed is an arbitrary data value.

After the seeds are arranged and data is given to each seed, a closest seed of each pixel of the image Im is determined from among the seeds in accordance with distances based on spatial positions and data values. For example, if it is assumed that a spatial position of each pixel of the image Im is ($x_{pix}$, $y_{pix}$), YCbCr data of the pixel is ($Y_{pix}$, $Cb_{pix}$, $Cr_{pix}$), the spatial position of an ith seed of the image Im is ($X_{seed\_i}$, $Y_{seed\_i}$), and the YCbCr data of the ith seed is ($Y_{seed\_i}$, $Cb_{seed\_i}$, $Cr_{seed\_i}$). A distance $D_i$ between the pixel and the ith seed may be calculated using Equation 1.

$$D_i = \sqrt{(x_{pix} - x_{seed\_i})^2 + (y_{pix} - y_{seed\_i})^2 + (Y_{pix} - Y_{seed\_i})^2 + (Cb_{pix} - Cb_{seed\_i})^2 + (Cr_{pix} - Cr_{seed\_i})^2} \quad (1)$$

As described above, distances between each pixel of the image Im and the seeds are calculated and a seed having a minimum distance is determined as the closest seed of the pixel. As such, the closest seed of every pixel of the image Im is determined.

Then, the data value of each seed is updated to an average of the data values of pixels of which the seed is determined as the closest seed. For example, if a first seed S1 is determined as the closest pixel of ten pixels, the data value of the first seed S1 is updated to an average of the data values of those ten pixels. The same principal is applied to second and third seeds S2 and S3 and other seeds. Likewise, the spatial positions of the seeds are also updated. In more detail, the spatial position of each seed is updated to an average of the spatial positions of the pixels of which the seed is determined as the closest seed. For example, if the first seed S1 is determined as the closest pixel of ten pixels, the spatial position of the first seed S1 is updated to an average of the spatial positions of those ten pixels. The same principal is applied to second and third seeds S2 and S3 and other seeds.

Figure 1B:
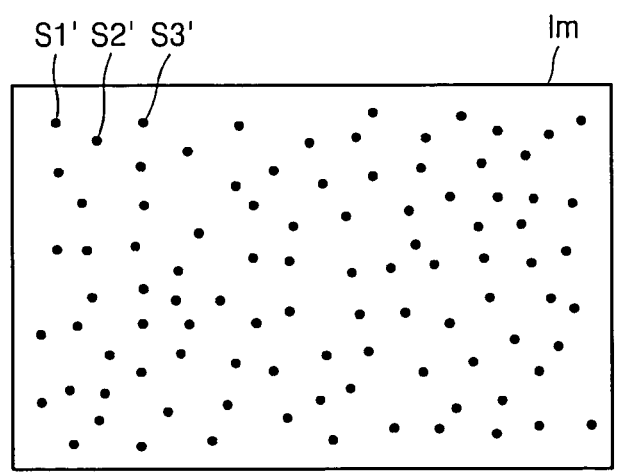
FIG. 1B is a schematic conceptual view of an example of an image showing an updated distribution of the seeds illustrated in FIG. 1A by dividing the image into a plurality of clusters one time, by using a k-means algorithm, according to an embodiment of the present invention.

FIG. 1B is a schematic conceptual view of an example of an image showing an updated distribution of the seeds illustrated in FIG. 1A by dividing the image into a plurality of clusters one time, by using a k-means algorithm, according to an embodiment of the present invention. FIG. 1B is a schematic conceptual view of an example of an image Im in which the spatial positions of the first, second, and third seeds S1, S2, and S3 and the other seeds which are illustrated in FIG. 1A are updated to the spatial positions of first, second, and third seeds S1', S2', and S3' and other seeds, according to an embodiment of the present invention.

Figure 1C:
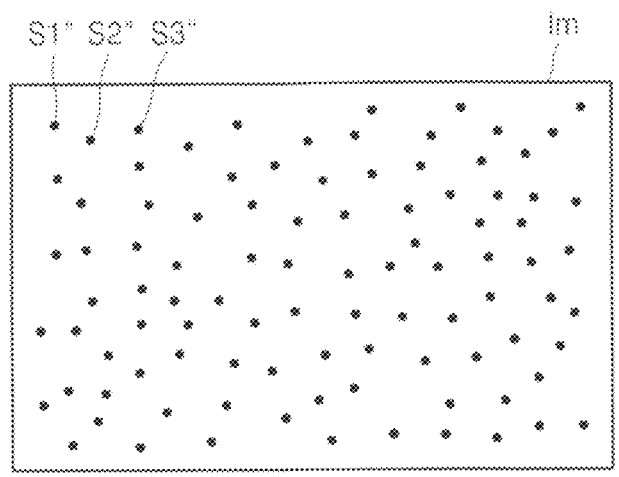
FIG. 1C is a schematic conceptual view of an example of an image showing an updated distribution of seeds illustrated in FIG. 1B by dividing the image into a plurality of clusters one more time, according to an embodiment of the present invention.

After the seeds are updated as described above, the closest seed of each pixel of the image Im is determined from among the updated seeds in accordance with the distances based on the spatial positions and the data values. Then, the data value of each seed is re-updated to an average of the data values of the pixels of which the seed is determined as the closest seed, and the spatial position of each seed is re-updated to an average of the spatial positions of the pixels of which the seed is determined as the closest seed. FIG. 1C is a schematic conceptual view of an example of an image Im in which the spatial positions of the first, second, and third seeds S1', S2', and S3' and the other seeds which are illustrated in FIG. 1B are re-updated to the spatial positions of first, second, and third seeds S1", S2", and S3" and other seeds, according to an embodiment of the present invention.

The updating of the seeds may be repeated one or more times as is necessary. If a difference between the spatial position and the data value of each seed before the updating is performed and the spatial position and the data value of the seed after the updating is performed is greater than a threshold value, the updating of the seeds is repeated. If the difference between the spatial position and the data value of the seed before the updating is performed and the spatial position and the data value of the seed after the updating is performed is equal to or less than the threshold value, the updating of the seeds is completed. The threshold value may vary as is necessary. The lower the threshold value, the more precisely the image Im is divided.

Figure 2A:
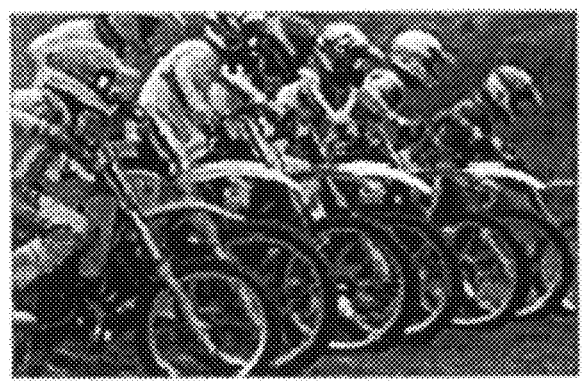
FIG. 2A shows an example of an original photographic image.
Figure 2B:
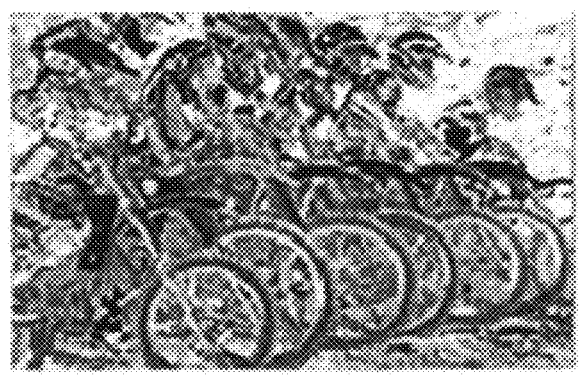
FIG. 2B shows an example of an image obtained by dividing the original photographic image of FIG. 2A into a plurality of clusters by using a k-means algorithm, according to an embodiment of the present invention.

When the updating of the seeds is completed, the image Im is divided into a plurality of clusters by grouping pixels of which each seed is determined as the closest seed, into the same cluster. For example, pixels of which the first seed S1" is determined as the closest seed are grouped into the same cluster such as a first cluster, pixels of which the second seed S2" is determined as the closest seed are grouped into the same cluster such as a second cluster, and pixels of which the third seed S3" is determined as the closest seed are grouped into the same cluster such as a third cluster. FIG. 2A shows an example of an original photographic image. FIG. 2B shows an example of an image obtained by dividing the original photographic image of FIG. 2A into a plurality of clusters by using a k-means algorithm, according to an embodiment of the present invention.

After an image is divided into a plurality of clusters as described above, variance data or standard deviation data for reducing noise is obtained. If each pixel of the image has YCbCr data, the variance data or the standard deviation data for reducing noise is obtained from each of Y, Cb, and Cr data. A method of obtaining variance data or standard deviation data for reducing noise will now be described with reference to FIGS. 3A through 3C, and 4, and the method is performed on each of the Y, Cb, and Cr data.

Figure 3A:
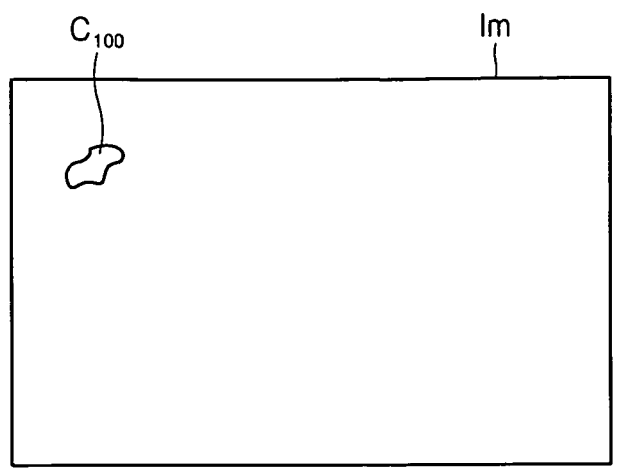
FIG. 3A is a conceptual view of an example of a cluster of an image divided into a plurality of clusters, according to an embodiment of the present invention.
Figure 3B:
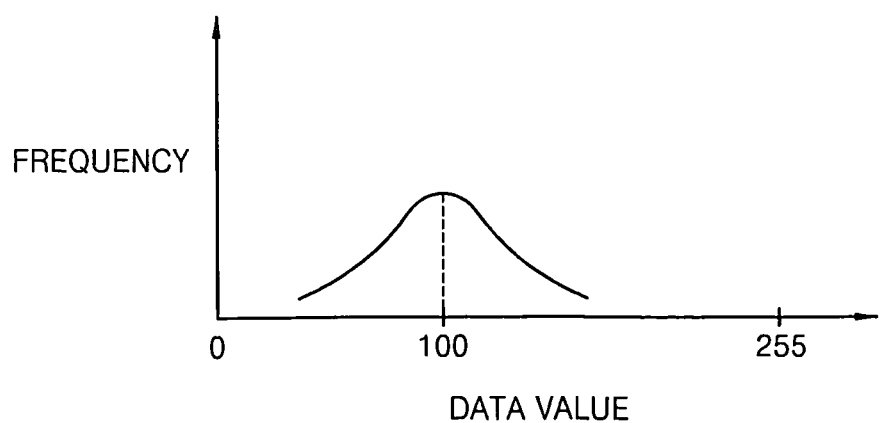
FIG. 3B is a schematic graph showing a data distribution of pixels of the cluster illustrated in FIG. 3A in an ideal case, according to an embodiment of the present invention.

FIG. 3A is a conceptual view of an example of a cluster $C_{100}$ of an image divided into a plurality of clusters in a case when an average of Y data values of pixels included in the cluster $C_{100}$ has a value 100, according to an embodiment of the present invention. FIG. 3B is a schematic graph showing ideal frequencies of Y data values of pixels included in the cluster $C_{100}$ illustrated in FIG. 3A, according to an embodiment of the present invention. In the graph illustrated in FIG. 3B, a horizontal axis indicates the Y data values and a vertical axis indicates the frequencies of the Y data values of the pixels included in the cluster $C_{100}$. As illustrated in FIG. 3B, if it is assumed that the Y data values of the pixels included in the cluster $C_{100}$ has an ideal distribution (Gaussian distribution, normal distribution), a variance or a standard deviation, and the average of the Y data values of the pixels included in the cluster $C_{100}$ may be simply obtained. Also, the variance or the standard deviation, and the average of the Y data values of other pixels included in each of other clusters may also be obtained. As such, the average of the Y data values of each cluster and the variance or the standard deviation corresponding to the average may be obtained. As a result, a graph of averages in the horizontal axis versus variances or standard deviations in the vertical axis may be obtained.

As described above, it is found that the distribution of the noise varies in accordance with the data values of the pixels while the method of obtaining variance data or standard deviation data for reducing noise, according to an embodiment of the present invention, is being performed. The variances or the standard deviations of data values of the noise are almost identical to the graph of the averages in the horizontal axis versus the variances or the standard deviations in the vertical axis. Thus, the noise may be partially reduced by using the graph of the averages in the horizontal axis versus the variances or the standard deviations in the vertical axis.

Figure 3C:
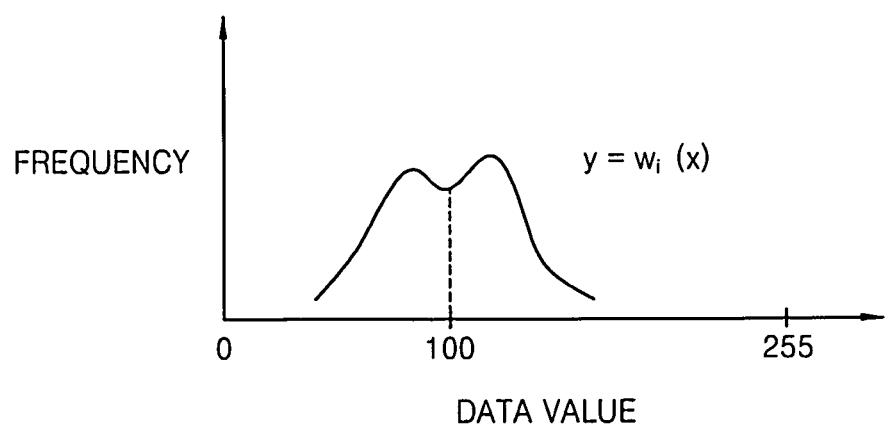
FIG. 3C is a schematic graph showing an example of a data distribution of pixels of the cluster illustrated in FIG. 3A in an actual case, according to an embodiment of the present invention.

However, while the method of obtaining variance data or standard deviation data for reducing noise, according to an embodiment of the present invention, is being performed, it is also found that a non-ideal graph illustrated in FIG. 3C which is totally different from the graph of FIG. 3B based on the ideal distribution of the Y data values is obtained when the distribution of the Y data values of the pixels included in the cluster $C_{100}$ is actually analyzed. Thus, if the averages and the variances or the standard deviations are obtained by assuming that a frequency distribution of the Y data values of the pixels included in the cluster $C_{100}$ is the ideal distribution as illustrated in FIG. 3B, and the averages and the variance data or the standard deviation data of the clusters are regarded as the averages and the variance data or the standard deviation data of the noise, the noise may be efficiently reduced.

Thus, in the method of obtaining variance data or standard deviation data for reducing noise, according to an embodiment of the present invention, actual frequency data of the Y data values of the pixels included in the cluster $C_{100}$ is checked by not assuming that the frequency distribution of the Y data values of the pixels included in the cluster $C_{100}$ is the ideal distribution as illustrated in FIG. 3B. For example, the frequency data may be represented by a graph illustrated in FIG. 3C. If it is assumed that an x axis indicates the data values of the pixels included in an ith cluster and a y axis indicates frequencies of the data values, the graph of FIG. 3C may be referred to as a graph of $y=w_i(x)$.

When the frequency data is checked as described above, a weighted average of the data values of the pixels included in each cluster is obtained in consideration of the frequency data of the cluster. If it is assumed that the number of pixels included in an nth cluster is k and data of an ith pixel is $x_i$, a weighted average $WM_n$ may be calculated using Equation 2.

$$WM_n = \frac{1}{k}\sum_{i=1}^{k} w_n(x_i) \cdot x_i \quad (2)$$

When the weighted average $WM_n$ is calculated as described above, the variance or the standard deviation of the data values of the pixels included in each cluster may be obtained by using the weighted average $WM_n$. A variance $\sigma_n^2$ of the data values of k pixels included in the nth cluster may be obtained using Equation 3 and a standard deviation an of the data values of the k pixels included in the nth cluster may be obtained using Equation 4.

$$\sigma_n^2 = \frac{1}{k}\sum_{i=1}^{k}(x_i - WM_n)^2 \quad (3)$$

$$\sigma_n = \sqrt{\frac{1}{k}\sum_{i=1}^{k}(x_i - WM_n)^2} \quad (4)$$

Figure 4:
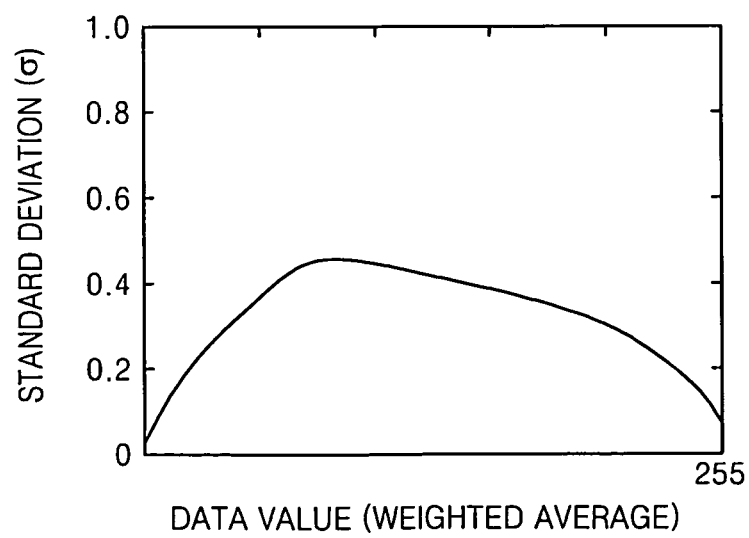
FIG. 4 is a graph of an example of standard deviation data for reducing noise which is obtained by using a method according to an embodiment of the present invention.

When the above procedures are performed on all the clusters, weighted averages $WM_n$ of the clusters may be obtained and thus the variances $\sigma_n^2$ and the standard deviations $\sigma_n$ corresponding to the weighted averages $WM_n$ may be obtained. That is, the variance data or the standard deviation data in accordance with weighted averages may be obtained by using the weighted averages and the variances or the standard deviations in the clusters. For example, if it is assumed that the horizontal axis indicates the weighted averages and the vertical axis indicates the standard deviations, a graph illustrated in FIG. 4 is obtained. As described above, it is found that the distribution of the noise varies in accordance with the data values of the pixels while the method of obtaining variance data or standard deviation data for reducing noise, according to an embodiment of the present invention, is being performed. Thus, the distribution of the noise is exactly identical to the graph illustrated in FIG. 4. That is, the graph illustrated in FIG. 4 or data of the graph may be regarded as the variance data or the standard deviation data for reducing noise. Accordingly, the noise of the image may be significantly reduced.

The graph illustrated in FIG. 4 may be separately obtained from each of Y, Cb, and Cr data. Furthermore, it is obvious that the graph illustrated in FIG. 4 may also be separately obtained from each of R, G, and B data. That is, if each pixel has data values having different formats, the graph illustrated in FIG. 4 may be separately obtained from each of the data values having different formats. For example, if each pixel has luminance data, first color data, and second color data, the graph illustrated in FIG. 4 may be separately obtained from each of the luminance data, the first color data, and the second color data.

The variance data or the standard deviation data for reducing noise which is obtained as described above may be used to reduce the noise by using various methods including a method of reducing noise by using a bilateral filter. The method of reducing noise by using a bilateral filter will now be briefly described.

Figure 5A:
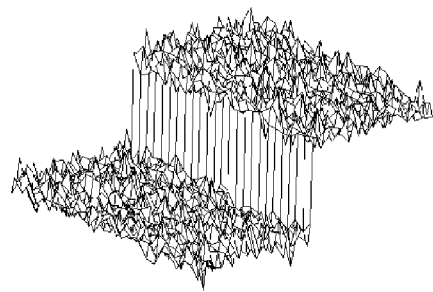
FIG. 5A is a graph visually expressing an example of a data distribution on an outline of a photographic subject of an image.
Figure 5B:
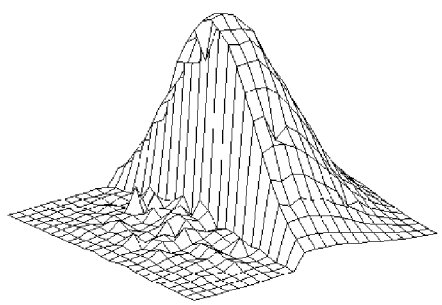
FIG. 5B is a graph visually expressing an example of a filter for reducing noise in the image illustrated in FIG. 5A, according to an embodiment of the present invention.
Figure 5C:
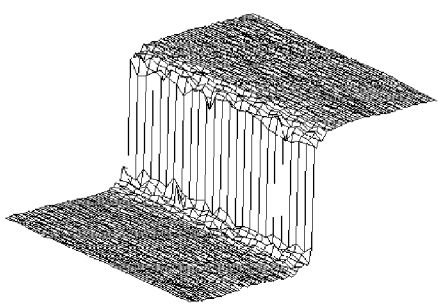
FIG. 5C is a graph visually expressing an example of a result obtained when the image illustrated in FIG. 5A is filtered by using the filter illustrated in FIG. 5B, according to an embodiment of the present invention.

FIG. 5A is a graph visually expressing an example of a data distribution on an outline of a photographic subject of an image. In particular, FIG. 5A is a graph visually expressing a data distribution on an outline of a photographic subject of a grayscale image. In a grayscale image, a photographic subject is represented by luminance variations. There are a large amount of luminance variations on an outline of the photographic subject as illustrated in FIG. 5A. In the data distribution illustrated in FIG. 5A, noise is present. Thus, in order to reduce the noise, a bilateral filter, which is visually expressed in the example of FIG. 5B is used. The bilateral filter has the shape of half a normal distribution, for example, because the outline of the photographic subject may be blurred if the data distribution of FIG. 5A is filtered by using a filter having the shape of the normal distribution. If the data distribution of FIG. 5A is filtered by using the bilateral filter of FIG. 5B, a result illustrated in the example of FIG. 5C may be obtained. When FIGS. 5A and 5C are compared to each other, it is clear that the noise is significantly reduced. Detailed information on the method of reducing noise by using a bilateral filter is provided in "Bilateral filtering for gray and color images", C. Tomasi and R. Manduchi, Proceedings of the 1998 IEEE International Conference on Computer Vision, Bombay, India, the disclosure of which is incorporated herein by reference in its entirety.

While the method of reducing noise by using a bilateral filter is performed, the shape of the bilateral filter of FIG. 5B needs to be properly modified in accordance with differences between data values (luminance values in a case of a gray-scale image) of the data distribution of FIG. 5A. This is because a distribution of the noise varies in accordance with the data values of pixels, as described above. That is, the distribution of the noise also varies in accordance with the differences between the data values of the data distribution of FIG. 5A and thus the size and/or the shape of the bilateral filter of FIG. 5B needs to be properly modified in accordance with the differences between the data values near the outline of the photographic subject. The variance data or the standard deviation data for reducing noise which is obtained according to the previous embodiment of the present invention, may be used to modify the size and/or the shape of the bilateral filter of FIG. 5B. For example, variances or standard deviations of the noise in accordance with the differences between the data values of the data distribution of FIG. 5A are checked by referring to the variance data or the standard deviation data for reducing noise, and then the bilateral filter of FIG. 5B which has the shape of half the normal distribution may be generated by using the variances or the standard deviations so as to be used to reduce the noise.

The variance data or the standard deviation data for reducing noise which is obtained as described above may be used to reduce the noise by using various methods. The variance data or the standard deviation data for reducing noise may be obtained by using a product that is developed along with a digital photographing apparatus. After that, when the completely developed product is produced in large quantities, recording media storing the variance data or the standard deviation data for reducing noise which is previously obtained may be included in digital photographing apparatuses.

Meanwhile, deviations in the distribution of the noise may occur to digital photographing apparatuses of the same model when the digital photographing apparatuses are produced in large quantities. For example, an imaging device for obtaining image data from projected light is disposed on a frame of the digital photographing apparatus and, if the position of the imaging device varies by even a little while the digital photographing apparatus is being produced, the distribution of the noise that occurs may vary. In addition, due to, for example, a precise difference of positions of barrel holders, the deviations in the distribution of the noise may also occur to digital photographing apparatuses of the same model when the digital photographing apparatuses are produced in large quantities. In order to prevent the deviations in the distribution of the noise, each of the digital photographing apparatuses produced in large quantities may possibly need to modify the variance data or the standard deviation data for reducing noise which is previously obtained, before being placed on the market.

Figure 6A:
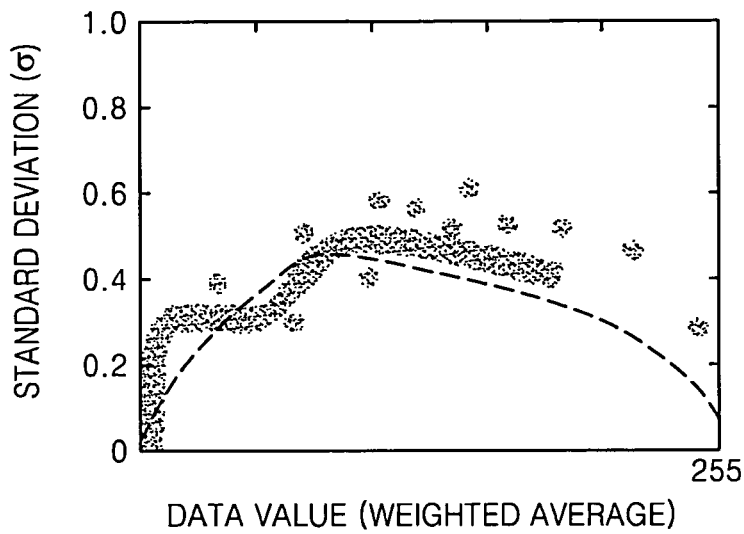
FIGS. 6A through 6C are graphs for describing an example of a method of modifying variance data or standard deviation data for reducing noise in accordance with characteristics of digital photographing apparatuses, according to an embodiment of the present invention.
Figure 6B:
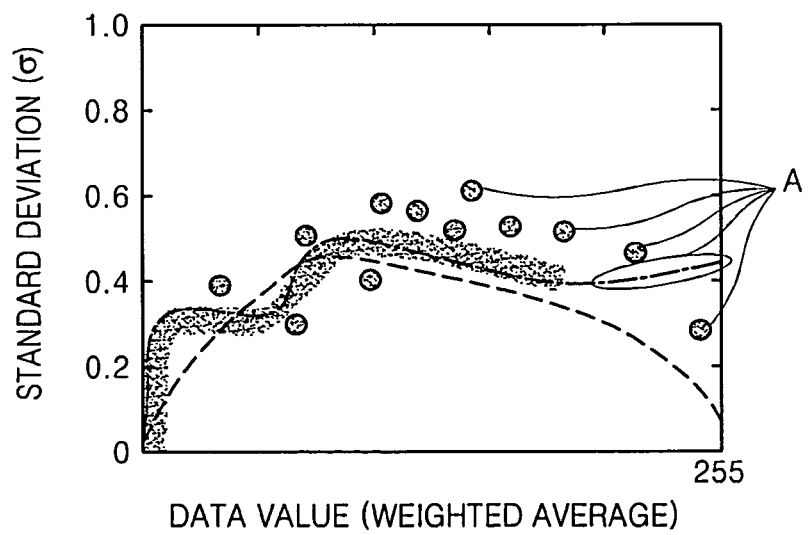
Figure 6C:
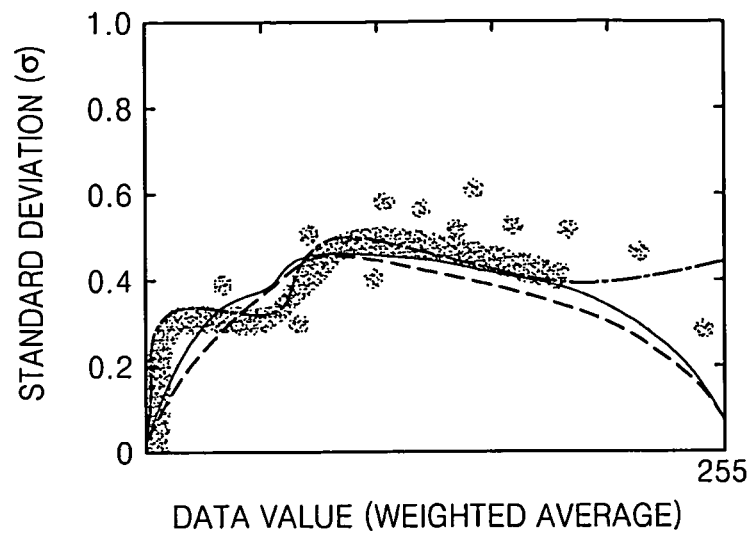

FIGS. 6A through 6C are graphs for describing an example of a method of modifying variance data or standard deviation data for reducing noise in accordance with characteristics of digital photographing apparatuses, according to an embodiment of the present invention. In FIG. 6, a dotted line indicates the graph illustrated in FIG. 4. Initially, an additional image is obtained by using one of a plurality of digital photographing apparatuses which are produced in large quantities. The additional image may include a single image or a plurality of images. Variance data or standard deviation data for reducing noise (hereinafter referred to as first data) is previously obtained before the digital photographing apparatuses are produced in large quantities, and the additional image is necessary to optimize the first data for each of the digital photographing apparatuses. Thus, a single image may be used as the additional image.

When the additional image is obtained, the additional image is divided into a plurality of clusters as described above according to a previous embodiment of the present invention, frequency data of data values of pixels included in each cluster of the additional image is checked, a weighted average of the data values of the pixels included in the cluster of the additional image is calculated in consideration of the frequency data of the cluster, a variance or a standard deviation of the data values of the pixels included in the cluster of the additional image is obtained by using the weighted average of the cluster, and variance data or standard deviation data in accordance with weighted averages of the additional image is obtained as second data. The second data may be obtained by using the same method that is used when the variance data or the standard deviation data for reducing noise is previously obtained. Thus, a detailed description thereof will be omitted here.

In FIG. 6A, dots indicate the second data that is the variance data or the standard deviation data in accordance with the weighted averages of the additional image. When the second data is obtained as described above, the first data is modified based on the second data. For example, an alternate long and short dashed line illustrated in FIG. 6B is obtained from the second data and then the dotted line illustrated in FIG. 6A which is obtained from the first data is modified into a solid line, as illustrated in FIG. 6C, by using the alternate long and short dashed line illustrated in FIG. 6B. That is, the solid line illustrated in FIG. 6C indicates the variance data or the standard deviation data for reducing noise which is ultimately obtained by modifying the first data using the second data. Various changes may be made when the first data is modified by using the second data. For example, the modifying of the first data by using the second data may be performed by using arithmetic means of the first and second data or by using weighted averages obtained by applying weights to the first data that is previously obtained. However, in this case, portions indicated by A of FIG. 6B may be regarded as outliers of the second data so as to be excluded and not used when the first data is modified.

Figure 7:
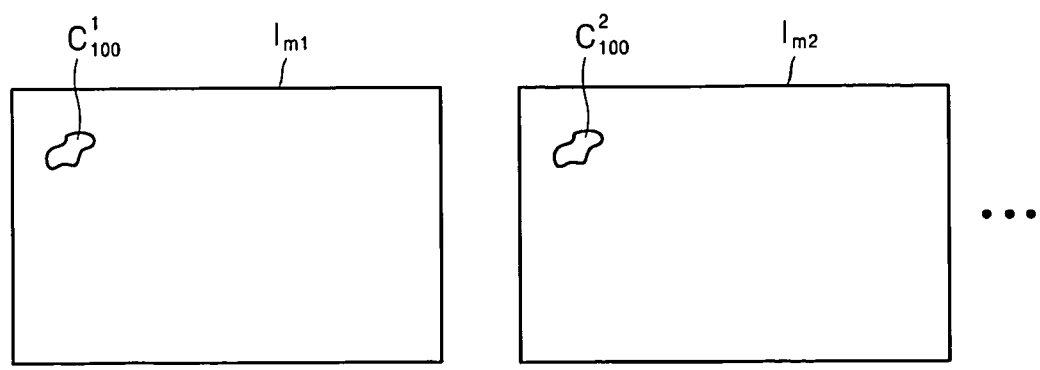
FIG. 7 is a conceptual view for describing an example of a method of dividing each of a plurality of images into a plurality of clusters in order to obtain variance data or standard deviation data for reducing noise, according to an embodiment of the present invention.

FIG. 7 is a conceptual view for describing an example of a method of dividing each of a plurality of images into a plurality of clusters in order to obtain variance data or standard deviation data for reducing noise, according to an embodiment of the present invention.

According to the previous embodiments of FIGS. 1A through 1C, 2A, 2B, 3A through 3C, and 4, variance data or standard deviation data for reducing noise is obtained by using a single image before digital photographing apparatuses are produced in large quantities. However, according to the current embodiment of the present invention, the variance data or the standard deviation data for reducing noise is obtained by using a plurality of images in order to increase accuracy of the variance data or the standard deviation data for reducing noise because the variance data or the standard deviation data for reducing noise is obtained before the digital photographing apparatuses are produced in large quantities.

If it is assumed that N images are used in order to obtain the variance data or the standard deviation data for reducing noise, each of the N images is divided into a plurality of clusters. In this case, clusters corresponding to each other may exist on the N images. FIG. 7 illustrates clusters $C^1_{100}$ and $C^2_{100}$ of first and second images Im1 and Im2, which correspond to each other. In FIG. 7, each of an average of Y data values of pixels included in the cluster $C^1_{100}$ of the first image Im1 and an average of the Y data values of the pixels included in the cluster $C^2_{200}$ of the second image Im2 has a value 100. As such, if averages of data values of clusters have the same value, the clusters are regarded as corresponding to each other. The variance data or the standard deviation data for reducing noise may be obtained by dividing each of the N images into a plurality of clusters and regarding clusters corresponding to each other as one cluster, and by performing the same procedures described above with reference to FIGS. 3A through 3C, and 4. A method of obtaining the variance data or the standard deviation data for reducing noise is described above and thus a detailed description thereof will be omitted here. If the variance data or the standard deviation data for reducing noise is obtained by dividing each of the N images into a plurality of clusters and regarding clusters corresponding to each other as one cluster, and by performing the same procedures described above with reference to FIGS. 3A through 3C, and 4, accuracy of the variance data or the standard deviation data for reducing noise may be further increased.

Figure 8:
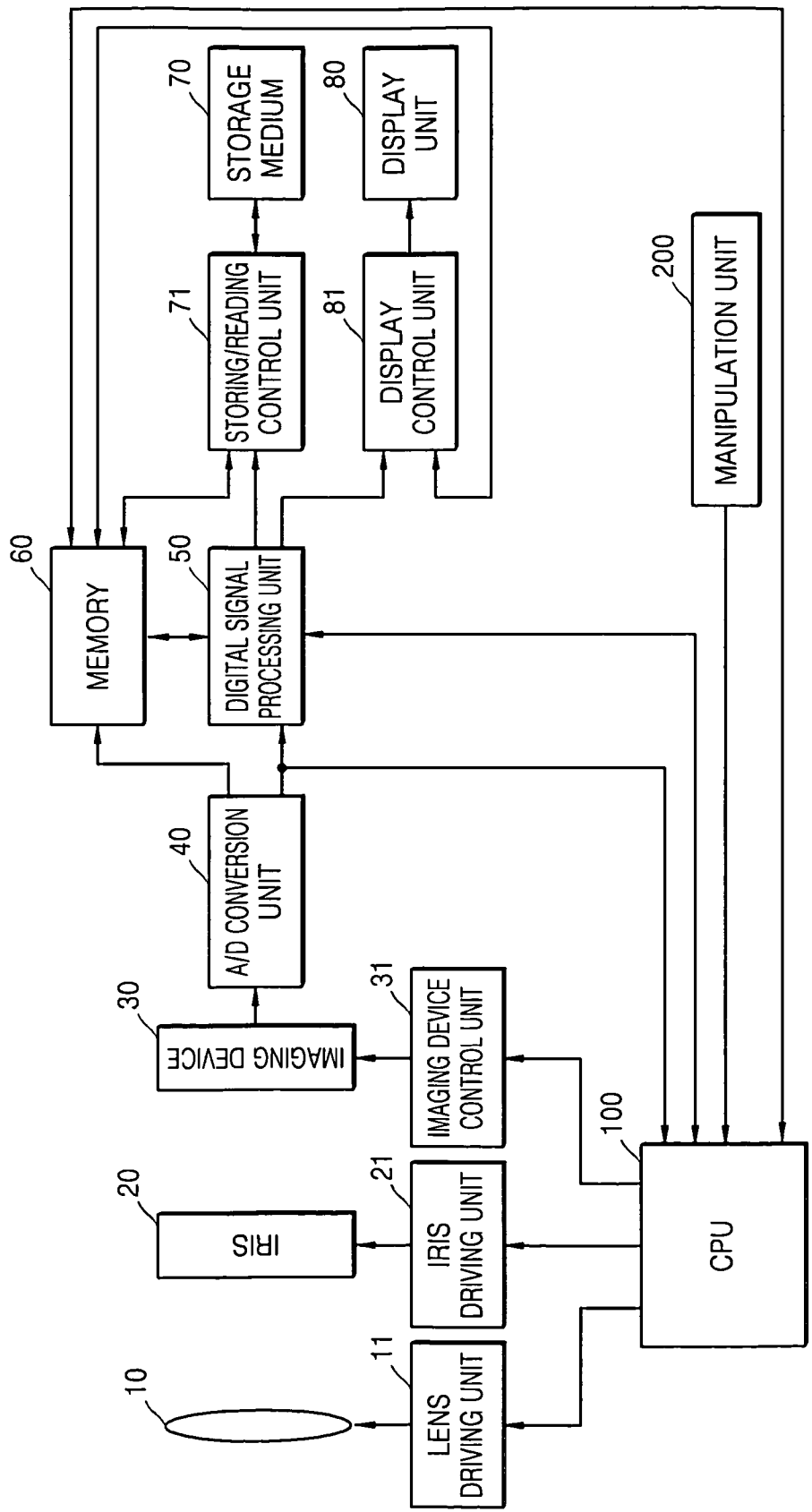
FIG. 8 is a schematic block diagram of an example of a digital photographing apparatus, according to an embodiment of the present invention.

FIG. 8 is a schematic block diagram of an example of a digital photographing apparatus, according to an embodiment of the present invention.

General operation of the digital photographing apparatus is managed by a central processing unit (CPU) 100 and the digital photographing apparatus includes a manipulation unit 200 including keys for generating electric signals based on a user's input. The electric signals generated by the manipulation unit 200 are transmitted to the CPU 100 so that the CPU 100 may control the digital photographing apparatus in accordance with the electric signals.

In a photographing mode, when an electric signal based on a user's input is applied to the CPU 100, the CPU 100 controls a lens driving unit 11, an iris driving unit 21, and an imaging device control unit 31 so as to adjust a position of a lens 10, an opening degree of an iris 20, and sensitivity of an imaging device 30, respectively. The imaging device 30 creates image data from input light and an analog-to-digital (A/D) conversion unit 40 converts analog data output from the imaging device 30 into digital data. In this case, it is obvious that the A/D conversion unit 40 may not be included in the digital photographing apparatus in accordance with characteristics of the imaging device 30.

The image data output from the imaging device 30 may be input to a digital signal processing unit 50 through a memory 60 or be directly input to the digital signal processing unit 50. When necessary, the image data may be input to the CPU 100. Here, examples of the memory 60 include read-only memory (ROM) and random access memory (RAM). When necessary, the digital signal processing unit 50 may perform digital signal processing such as gamma correction and white balance adjustment.

The image data output from the digital signal processing unit 50 may be transmitted to the display control unit 81 through the memory 60 or may be directly transmitted. The display control unit 81 controls a display unit 80 so as to display an image thereon. The image data output from the digital signal processing unit 50 is input to a storing/reading control unit 71 through the memory 60 or may be directly input. The storing/reading control unit 71 stores the image data in a storage medium 70 in accordance with a signal based on a user's input or may be automatically stored. It is obvious that the storing/reading control unit 71 may read image data from an image file stored in the storage medium 70, and input the image data to the display control unit 81 through the memory 60 or by any other path so as to display an image on the display unit 80. The storage medium 70 may be detachable from the digital photographing apparatus or may be permanently fixed in the digital photographing apparatus.

A program for executing a method of obtaining variance data or standard deviation data for reducing noise, according to the above embodiments of the present invention can be written in a recording medium. Here, the recording medium may be the memory 60 or the storage medium 70 which are illustrated in FIG. 8, or any other storage medium. Here, examples of the recording medium include magnetic storage media (e.g., ROM, floppy disks, hard disks, and the like) and optical recording media (e.g., CD-ROMs, or DVDs).

As described above, according to the above embodiments of the present invention, a clear and excellent quality image having high contrast may be obtained by significantly reducing noise in the image using variance data or standard deviation data for reducing noise which is stored in a recording medium when a digital photographing apparatus obtains image data from light projected onto an imaging device and then processes the image data.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of obtaining variance data or standard deviation data for reducing noise, the method comprising:
   (a) dividing an image into a plurality of clusters;
   (b) checking frequency data of data values of pixels included in each cluster;
   (c) obtaining a weighted average in consideration of frequency data of the data values of the pixels included in each cluster;
   (d) obtaining a variance or a standard deviation of the data values of the pixels included in each cluster by using the weighted average;
   (e) obtaining the variance data or standard deviation data in accordance with weighted averages by using the weighted average and the variance or the standard deviation in each cluster; and (f) filtering noise in the image using the variance data or standard deviation data.

2. The method of claim 1, wherein (a) is performed by using a k-means algorithm.

3. The method of claim 1, wherein (a) comprises:
(a1) arranging a plurality of seeds corresponding to the number of clusters on the image and giving an arbitrary data value to each seed;
(a2) determining a closest seed of each pixel of the image from among the seeds in accordance with distances based on spatial positions and data values;
(a3) updating a data value of each seed to an average of the data values of pixels of which the seed is determined as the closest seed, and updating a spatial position of each seed to an average of spatial positions of the pixels of which the seed is determined as the closest seed;
(a4) if a difference between the spatial position and the data value of each seed before the updating is performed and the spatial position and the data value of the seed after the updating is performed is greater than a threshold value, repeating (a1) through (a3);
(a5) if the difference between the spatial position and the data value of each seed before the updating is performed and the spatial position and the data value of the seed after the updating is performed is equal to or less than the threshold value, dividing the image into a plurality of clusters by grouping pixels of which each seed is determined as the closest seed, into the same cluster.

4. The method of claim 3, wherein each pixel has YCbCr data, and
wherein (a1) comprises giving arbitrary YCbCr data to each seed.

5. The method of claim 4, wherein (a2) comprises determining the closest seed of each pixel by calculating a distance between the pixel and each seed in accordance with Equation 1, by assuming that a spatial position of each pixel of the image is $(x_{pix}, y_{pix})$, YCbCr data of the pixel is $(Y_{pix}, Cb_{pix}, Cr_{pix})$, the spatial position of an ith seed of the image is $(x_{seed\_i}, y_{seed\_i})$, and the YCbCr data of the ith seed is $(Y_{seed\_i}, Cb_{seed\_i}, Cr_{seed\_i})$ $$D_i = \sqrt{\begin{array}{c}(x_{pix} - x_{seed\_i})^2 + (y_{pix} - y_{seed\_i})^2 + (Y_{pix} - Y_{seed\_i})^2 + \\ (Cb_{pix} - Cb_{seed\_i})^2 + (Cr_{pix} - Cr_{seed\_i})^2\end{array}}. \quad (1)$$

6. The method of claim 1, wherein each pixel has YCbCr data, and
wherein (b) through (e) are performed on each of Y, Cb, and Cr data.

7. The method of claim 1, wherein (b) comprises checking a graph of $y=w_i(x)$, by assuming that an x axis indicates the data values of the pixels included in an ith cluster and a y axis indicates frequencies of the data values.

8. The method of claim 7, wherein (c) comprises obtaining a weighted average $WM_n$ of the data values of the pixels included in each cluster in accordance with Equation 2, by assuming that the number of pixels included in an nth cluster is k and data of an ith pixel is $x_i$ $$WM_n = \frac{1}{k}\sum_{i=1}^{k} w_n(x_i) \cdot x_i. \quad (2)$$

9. The method of claim 8, wherein (d) comprises obtaining a variance $\sigma_n^2$ of the data values of k pixels included in the nth cluster in accordance with Equation 3 or obtaining a standard deviation $\sigma_n$ of the data values of the k pixels included in the nth cluster in accordance with Equation 4

$$\sigma_n^2 = \frac{1}{k}\sum_{i=1}^{k}(x_i - WM_n)^2 \quad (3)$$

$$\sigma_n = \sqrt{\frac{1}{k}\sum_{i=1}^{k}(x_i - WM_n)^2}. \quad (4)$$

10. The method of claim 9, wherein (e) comprises obtaining the variance data or the standard deviation data in accordance with the weighted averages by assuming that a horizontal axis indicates weighted averages and a vertical axis indicates variances or standard deviations.

11. The method of claim 1, wherein each pixel has data values having different formats, and
wherein (b) through (e) are performed on each of the data values having different formats.

12. The method of claim 1, wherein each pixel has R, G, and B data, and
wherein (b) through (e) are performed on each of the R, G, and B data.

13. The method of claim 1, wherein each pixel has luminance data, first color data, and second color data, and
wherein (b) through (e) are performed on each of the luminance data, the first color data, and the second color data.

14. The method of claim 1, wherein (a) comprises dividing each of N images into a plurality of clusters, and
wherein clusters corresponding to each other are regarded as one cluster in (b) through (e).

15. A digital photographing apparatus comprising a recording medium storing variance data or standard deviation data for reducing noise which is obtained in accordance with the method of claim 1.

16. A method of obtaining variance data or standard deviation data for reducing noise, the method comprising:
(i) preparing a digital photographing apparatus comprising a recording medium storing variance data or standard deviation data for reducing noise, which is obtained in accordance with the method of claim 1, as first data;
(ii) obtaining an additional image by using the digital photographing apparatus;
(iii) dividing the additional image obtained in (ii) into a plurality of clusters;
(iv) checking frequency data of data values of pixels included in each cluster of the additional image;
(v) obtaining a weighted average of the data values of the pixels included in each cluster of the additional image in consideration of the frequency data of the data values of the pixels included in each cluster;
(vi) obtaining a variance or a standard deviation of the data values of the pixels included in each cluster of the additional image by using the weighted average;
(vii) obtaining variance data or standard deviation data in accordance with weighted averages, as second data by using the weighted average and the variance or the standard deviation in each cluster of the additional image; and
(viii) obtaining the variance data or the standard deviation data for reducing noise which is ultimately obtained by modifying the first data by using the second data.

17. A digital photographing apparatus comprising a recording medium storing variance data or standard deviation data for reducing noise, which is obtained in accordance with the method of claim 16.

* * * * *